(12) United States Patent
Sonoki

(10) Patent No.: US 6,784,417 B2
(45) Date of Patent: Aug. 31, 2004

(54) OPTICAL ENCODER

(75) Inventor: Hirohiko Sonoki, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/727,524

(22) Filed: Dec. 5, 2003

(65) Prior Publication Data

US 2004/0113058 A1 Jun. 17, 2004

(30) Foreign Application Priority Data

Dec. 9, 2002 (JP) ........................................ 2002-356642

(51) Int. Cl.[7] ................................................ G01D 5/34
(52) U.S. Cl. ............................. 250/231.13; 250/231.16
(58) Field of Search ........................ 250/231.13, 231.14, 250/231.16, 231.17, 231.18, 232, 233, 227.11, 227.21; 356/614, 616, 617; 341/11, 13, 31

(56) References Cited

U.S. PATENT DOCUMENTS 6,031,222 A * 2/2000 Carapelli ............... 250/231.13

FOREIGN PATENT DOCUMENTS

| JP | 08-005407 | 1/1996 | |
|---|---|---|---|
| JP | 09-196703 | 7/1997 | |
| JP | 10-332432 | 12/1998 | |
| JP | 2003-344112 A | * 12/2003 | ............ G01D/5/36 |

* cited by examiner

Primary Examiner—Kevin Pyo
(74) Attorney, Agent, or Firm—Nixon Peabody, LLP (57) ABSTRACT

In an optical encoder, a rotary disk plate has slits formed along a circumferential direction and rotates to intermittently pass light through the slits such that the passed light has a periodical intensity variation. A stationary mask plate has apertures spatially shifted from each other and splits the passed light into two light fluxes having different phases of the periodical intensity variation due to the spatial shift of the apertures. Two light receiving elements receive the two light fluxes respectively, and generate two electric signals having a same cycle corresponding to the periodical intensity variation of the light fluxes and different electric phases. A light guiding member is provided between the stationary mask plate and the light receiving elements to guide the light fluxes while expanding the spacing between the light fluxes such that the light receiving elements are spaced from each other at a distance greater than the spacing of the light fluxes. The light guiding member has an incident face to admit the light flux and an exit face to send the light flux to the light receiving element. The incident face is convexly curved to converge the light flux, thereby efficiently transmitting the light flux to the exit face.

5 Claims, 8 Drawing Sheets

OPTICAL ENCODER

BACKGROUND OF THE INVENTION

1. Technical Field of the Invention

The present invention relates to an optical encoder provided by combining a light emitting element and a light receiving element. More specifically, the present invention relates to an optical encoder using a light guiding member (light guide) on the light receiving element.

2. Prior Art

Generally, an optical encoder has a rotary disk plate and a stationary mask plate that are closely disposed parallel to each other. A light emitting element and a light receiving element face to each other so as to sandwich the plates. An optical axis connecting the light emitting element and the light receiving element is disposed parallel to a rotary shaft of the rotary disk plate. The rotary disk plate rotates around the rotary shaft. The stationary mask plate is fixed to a body that holds the rotary shaft. Near an outside periphery of the rotary disk plate, a specified number of slits are radially formed at regular intervals. In this specification, a term "rotary slit" may be used hereafter to represent a slit formed on the rotary disk plate. Since the number of rotary slits corresponds to the resolution, this specification may use the number of rotary slits to represent resolution P. The stationary mask plate also has one or more slits having almost the same shape as the rotary slits at the same intervals as for them. In this specification, a term "stationary slit" is used hereafter to represent a slit formed on the stationary mask plate. In some cases, the stationary slit may be referred to as an aperture in distinction from the slit formed on the rotary disk plate. The rotary slit and the stationary slit are formed by cutting out light blocking materials such as metal and resin. Alternatively, slits may be formed by using a material such as translucent glass or resin, forming a light blocking film on either surface thereof, and selectively etching the light blocking film. The width of the slit formed in this manner approximates to a half of the slit interval. According to the above-mentioned configuration, revolving the rotary disk plate changes a relative position between the rotary slit and the stationary slit. Light irradiated from the light emitting element is repeatedly blocked and passed to be an intermittent light flux and enters the light receiving element. The light receiving element converts the intermittent light flux into a cyclical electric signal for output. The cycle or frequency of the electric signal can be used to detect the number of revolutions of the rotary disk plate.

Such an optical encoder is disclosed in Japanese Patent Unexamined Publication No. 1996-005407, Japanese Patent Unexamined Publication No. 1997-196703, Japanese Patent Unexamined Publication No. 1998-332432, and earlier Japanese Patent Application No. 2002-150268 (not yet publicated)

In some cases, the optical encoder generates a plurality of light fluxes having intermittent phases deviated from each other. The light receiving element outputs corresponding electric signals having phases shifted from each other. When detecting a rotation direction as well as the number of revolutions, for example, the light receiving element outputs two electric signals having phases shifted from each other for 90 degrees. It is possible to detect a rotation direction of the rotary disk plate based on the relative phase relationship between 2-phase electric signals. When it is necessary to output electric signals with different phases, a plurality of stationary slits is disposed at specified angular intervals (n×Ap+Af) against a series of circumferentially arranged rotary slits (hereafter also referred to as a track in this specification). Here, n signifies a positive integer between 0 and resolution P, Ap an angular interval of the rotary slit, and Af an angle difference equivalent to the needed phase difference. In this case, when n=0, the stationary slits are disposed most closely. When n=P/2, the stationary slits are disposed most separately along the radial direction. Alternatively, there are disposed two series of radially separated stationary slits on the stationary mask plate. In this case, Af denotes an angular displacement between two series of stationary slits. By contrast, it may be preferable to provide the rotary disk plate with two concentric tracks and relatively shift positions of the rotary slits formed on each track as much as Af. In this case, the stationary slits corresponding to the tracks just need to be shifted from each other as much as n×Ap. Also in this case, when n=0, the stationary slits are disposed most closely. When n=P/2, the stationary slits are disposed most separately along the radial direction.

It is ideal to uneccentrically mount the rotary disk plate against the rotary shaft. Actually, however, the rotary disk plate is slightly eccentric against the rotary shaft due to various error factors. Accordingly, there is an eccentricity also on the circular track against the rotary shaft when the circular track is formed on the rotary disk plate and comprises a series of rotary slits. Such eccentricity causes a phase difference between electric signals to deviate from the preset phase difference in accordance with revolutions of the rotary disk plate, generating a so-called phase variation. The eccentricity of rotary slits causes a maximum phase variation under the condition of n=P/2 or a minimum phase variation under the condition of n=0 or P in outputs from each light receiving element. When there are two tracks of rotary slits or stationary slits separately along the radial direction, decreasing an interval between the tracks along the radial direction also decreases a phase variation. That is to say, narrowing an interval for disposing the light receiving elements decreases a phase variation in output electric signals. As a means for narrowing a spacing for disposing the light receiving elements, it is possible to accumulate a plurality of light receiving areas on the same chip. However, accumulating a plurality of light receiving areas on a single chip increases costs of the light receiving element. On the contrary, if we use a low-price, general-purpose product having one light receiving area per chip, it is impossible to dispose chips adjacently to each other. A remarkable phase variation results. It is difficult to provide high resolutions.

SUMMARY OF THE INVENTION

The present invention has been made in consideration of the above-mentioned problems of the prior art. It is therefore a major object of the present invention to provide a low-cost, high-resolution optical encoder capable of decreasing output phase variations due to eccentricity of a rotary slit. In addition, it is a minor object of the present invention to improve the efficient use of light fluxes guided from a light emitting element to a light receiving element.

To achieve these objects, there is provided an optical encoder comprising a rotary disk plate and a stationary mask plate disposed parallel to each other, and a light emitting element and a light receiving element disposed opposite to each other with respect to a set of the rotary disk plate and the stationary mask plate, wherein the rotary disk plate has slits formed along a circumferential direction thereof at a given interval, and rotates to intermittently pass light from the light emitting element through the slits such that the passed light has a periodical intensity variation. The stationary mask plate has apertures spatially shifted from each other, and splits the passed light by the apertures into at least two light fluxes with a given spacing, the two light fluxes having different phases of the periodical intensity variation due to the spatial shift of the apertures. There are provided at least two light receiving elements which receive the two light fluxes respectively, and generate at least two electric signals having a cycle corresponding to the periodical intensity variation of the light fluxes and having different electric phases corresponding to the different phases of the periodical intensity variations. The optical encoder further comprises a light guiding member provided between the stationary mask plate and the light receiving elements to guide the light fluxes from the stationary mask plate to the respective light receiving elements while expanding the spacing between the light fluxes such that the light receiving elements are spaced from each other at a distance greater than the spacing of the light fluxes. The light guiding member has an incident face to admit the light flux and an exit face to send the light flux to the light receiving element. At least the incident face is convexly curved to converge the light flux, thereby efficiently transmitting the light flux to the exit face.

Preferably, the exit face is also convexly curved to condense the light flux, thereby efficiently sending the light flux to the light receiving element.

In a specific form, the stationary mask plate has the apertures which are arranged along the circumferential direction of the rotary disk plate, and which are divided into two groups spaced from each other in a radial direction of the rotary disk plate, and the two groups of the apertures split the light intermittently passed through the rotary disk plate into the two light fluxes with leaving the spacing therebetween.

Alternatively, the stationary mask plate has the apertures which are arranged along the circumferential direction of the rotary disk plate, and which are divided into two groups spaced from each other in the circumferential direction, and the two groups of the apertures split the light intermittently passed through the rotary disk plate into the two light fluxes with leaving the spacing therebetween.

Expediently, the two light receiving elements are both accommodated inside an outer periphery of the rotary disk plate for miniaturization.

According to the general feature of the present invention, a compact optical rotary encoder is provided with a light guiding member (light guide) between a stationary slit and a light receiving element. The light guide admits a plurality of light fluxes with different phases in a narrow area, and then guides the light fluxes toward a plurality of light receiving elements separately disposed in a wider area. The stationary slits (apertures) for each output phase are disposed in as narrow an area as possible. The low-price light receiving elements are disposed in a wide area with a sufficient spacing. The light guide is inserted between the stationary slit disposed in a narrow area and the light receiving elements disposed in a wide area to guide the light fluxes to the light receiving elements. For example, the light guide is so shaped and structured that an incident light flux can repeat the total reflection and radiate. There is adjacently disposed a plurality of stationary slits having different spatial phases. From the stationary slits, the light guide guides light fluxes to the separately disposed light receiving elements with a minimal loss in the amount of received light. Using such light guide, it is possible to provide the low-price optical rotary encoder excellent in the phase accuracy of output signal waveforms.

In the compact optical rotary encoder according to the specific feature of the present invention, the light guiding member comprises a transparent component including an incident face to admit a light flux and an exit face to issue the light flux to each light receiving element. The total reflection surface is used for all parts of the light guiding member except the incident face and the exit face. At least the incident face is convexly curved to condense and efficiently guide light fluxes to the exit face. The incident face of the light guiding member (light guide) is shaped to be a convex lens so that diffused light fluxes from the light emitting element refract on the convex lens surface at the incidence and becomes almost parallel rays. In this manner, when the light flux forms an incident angle against the reflective surface between the incident face and the exit face, the incident angle becomes smaller than the critical angle. The light flux is efficiently guided to the exit face by stably repeating the total reflection. When the exit face of the light guide is convexly curved, it is possible to collect light fluxes after repeating the total reflection and send them to each light receiving element. This is useful when light fluxes radiated from the light guides diffuse before reaching the light receiving elements to decrease the amount of received light. Shaping the exit face into a convex lens makes it possible to reliably converge light fluxes at the light receiving element.

DETAILED DESCRIPTION OF THE INVENTION

Figure 1:
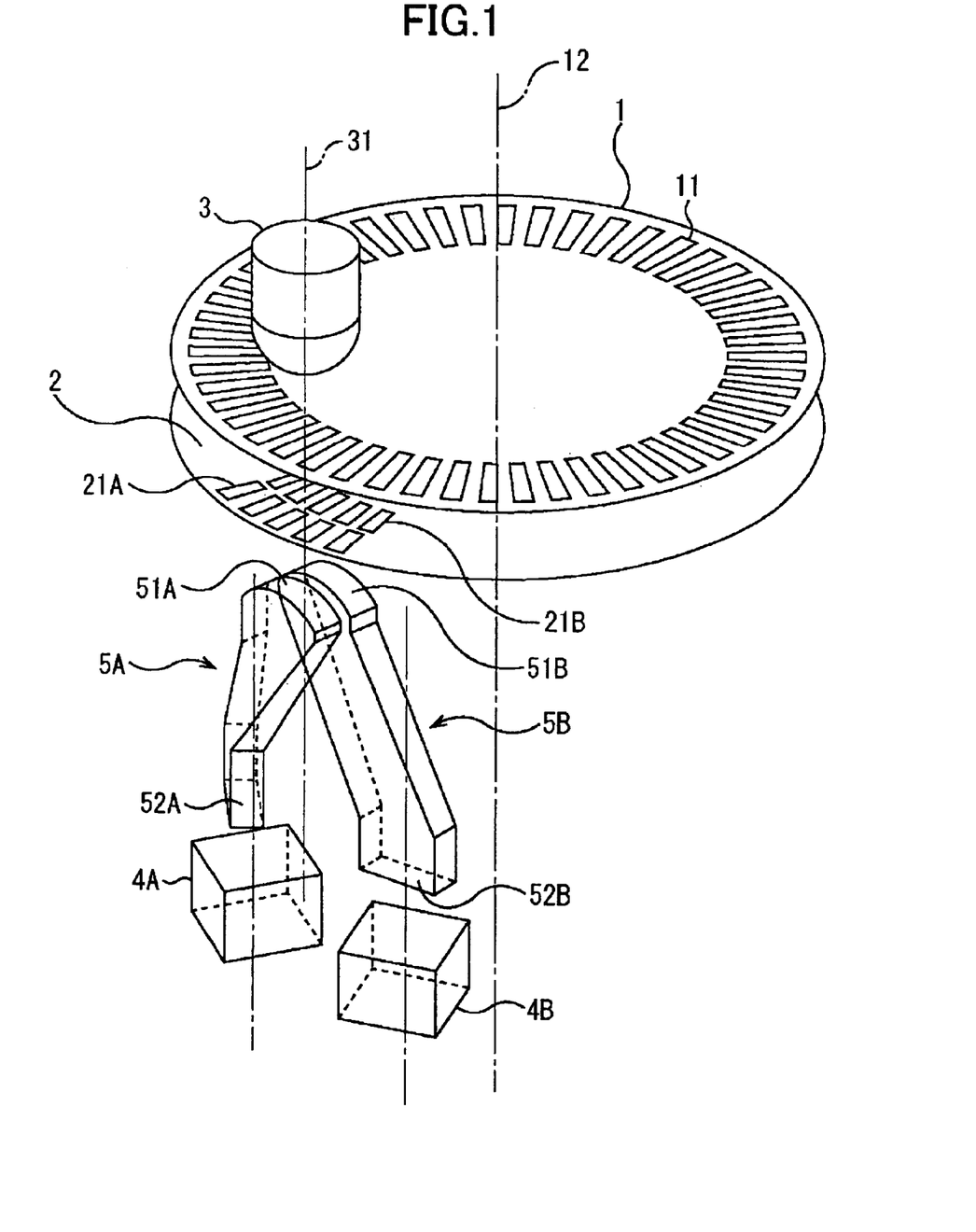
FIG. 1 is a schematic perspective view showing a first embodiment of an optical encoder according to the present invention.

Embodiments of the present invention will be described in further detail with reference to the accompanying drawings. FIG. 1 is a schematic perspective view showing a first embodiment of an optical encoder according to the present invention. As shown in FIG. 1, the optical encoder comprises a rotary disk plate 1 and a stationary mask plate 2 disposed parallel to each other, and a light emitting element 3 and light receiving elements 4A and 4B disposed opposite to each other in a manner of sandwiching these plates. On the rotary disk plate 1, there are formed rotary slits 11 at a specified angular interval Ap along the circumferential direction. The number of rotary slits 11 is represented by resolution P. According to this configuration, the rotary disk plate 1 revolves around the rotary shaft 12 to intermittently pass the light from the light emitting element 3 through the rotary slits 11.

The stationary mask plate 2 has apertures to split the light intermittently passing through the rotary disk plate 1 into at least two light fluxes having intermittent phases shifted from each other. According to the embodiment, the apertures of the stationary mask plate 2 comprise a group of stationary slits 21A and a group of stationary slits 21B to split the light into two light fluxes having phases shifted from each other. That is to say, the stationary mask plate 2 has two tracks of apertures that are arranged along the circumferential direction and are separated along the radial direction. The two tracks of apertures intermittently split the light passing through the rotary disk plate 1 into at least two light fluxes having phases shifted from each other. In the embodiment, the angular interval between the stationary slit equals that between the rotary slits 11. There is a spatial phase shift of angular interval Af between the group of stationary slits 21A and the group of stationary slits 21B. Two light receiving elements 4A and 4B are provided so as to correspond to the groups of stationary slits 21A and stationary slits 21B. The light receiving elements receive the above-mentioned two light fluxes respectively and output 2-phase electric signals that have a cycle corresponding to the intermittence and have phases shifted from each other at an electrical degree of Af.

As a major feature of the present invention, a light guiding member is provided between the stationary mask plate 2 and a set of light receiving elements 4A and 4B. According to the embodiment, the light guiding member comprises two light guides 5A and 5B. The pair of light guides 5A and 5B extend the close distance between two light fluxes and guide the two light fluxes from the stationary mask plate 2 to the two corresponding light receiving elements 4A and 4B. This configuration allows the two light receiving elements 4A and 4B to be disposed with an extended distance longer than the separating spacing between the two light fluxes, i.e., the radial spacing between the group of stationary slits 21A and the group of stationary slits 21B.

As a minor feature of the present invention, the light guide 5A comprises a transparent molding including an incident face 51A to accept a light flux and an exit face 52A to send the light flux out to the light receiving element 4A. The light guide 5A provides total reflection on all surfaces except the incident face 51A and the exit face 52A. The incident face 51A comprises a convexly curved surface, condenses light fluxes, and efficiently guides them to the exit face 52A. The light guide 5B is also configured in the same manner as the light guide 5A. The incident face 51B is processed like a convexly curved lens surface. A light flux enters the light guides 5A and 5B from the incident faces 51A and 51B and goes to a reflective surface. If an incident angle against the reflective surface is smaller than a critical angle that determines the total reflection, the light flux efficiently reaches the exit faces 52A and 52B. Accordingly, it is important to control an incident angle against the reflective surface by the light flux that enters the light guides 5A and 5B. For this purpose, the present invention shapes the incident faces 51A and 51B of the light guides 5A and 5B into a convex lens. It is intended that a diffused light flux from the light emitting element 3 will refract on the convex lens surface and become almost parallel rays when entering the light guides 5A and 5B. In this manner, the incident angle against the reflective surface almost becomes smaller than the critical angle. The light flux repeats the total reflection inside the light guide and efficiently radiates from the exit faces 52A and 52B.

The following describes the shape of the light guides 5A and 5B in details. The incident faces 51A and 51B are curved so as to refract the incident light flux and generate almost parallel rays from the light flux inside the light guide. According to the embodiment, the light guides 5A and 5B have a small thickness (along the radial direction of the encoder). The width thereof along the circumferential direction is larger than the thickness. The light emitting element 3 radiates a light flux at a small diffusion angle along the thickness direction and at a large diffusion angle along the circumferential direction. Accordingly, the incident faces 51A and 51B of the light guides 5A and 5B are shaped to be columnar and to be a convex lens only along the circumferential direction corresponding to a wider diffusion angle of the light flux. The incident face can be otherwise shaped to be convexly spherical or non-spherical.

Generally, a printed circuit board for mounting the encoder's light receiving elements 4A and 4B is shaped almost similarly to an external diameter of the rotary disk plate 1. The external diameter of the rotary disk plate 1 determines an outer shape of the encoder as a product. However, a small-size encoder may allow the light receiving elements 4A and 4B to be positioned outside the external diameter of the rotary disk plate 1. In this case, the printed circuit board for mounting the light receiving elements 4A and 4B also protrudes from the external diameter of the rotary disk plate 1. The final outer shape of the encoder as a product depends on the arrangement of the light receiving elements 4A and 4B. Conventionally, the final product becomes larger than the external diameter and is shaped otherwise than to be circular. Since the present invention disposes the flat light guides 5A and 5B separately along the circumferential direction as shown in FIG. 1, the light receiving elements 4A and 4B can be positioned within the external diameter. This makes it possible to mount the light receiving elements 4A and 4B on a printed circuit board having almost the same shape as the outer shape of the rotary disk plate 1 for miniaturization of the encoder. Further, the light receiving elements 4A and 4B can be disposed along the circumferential direction via the light guides 5A and 5B. Consequently, even if the track of stationary slits 21A and the track of stationary slits 21B are formed separately along the radial direction according to the embodiment, the light receiving elements 4A and 4B can be placed within the external diameter of the rotary disk plate 1. In this manner, the encoder can be miniaturized. When the track of stationary slits 21A and the track of stationary slits 21B are formed separately along the radial direction, it is a conventional practice to also dispose the light receiving elements 4A and 4B separately along the radial direction. In such case, one of the light receiving elements 4A and 4B protrudes from the external diameter of the rotary disk plate, making it difficult to miniaturize the encoder.

Figure 2:
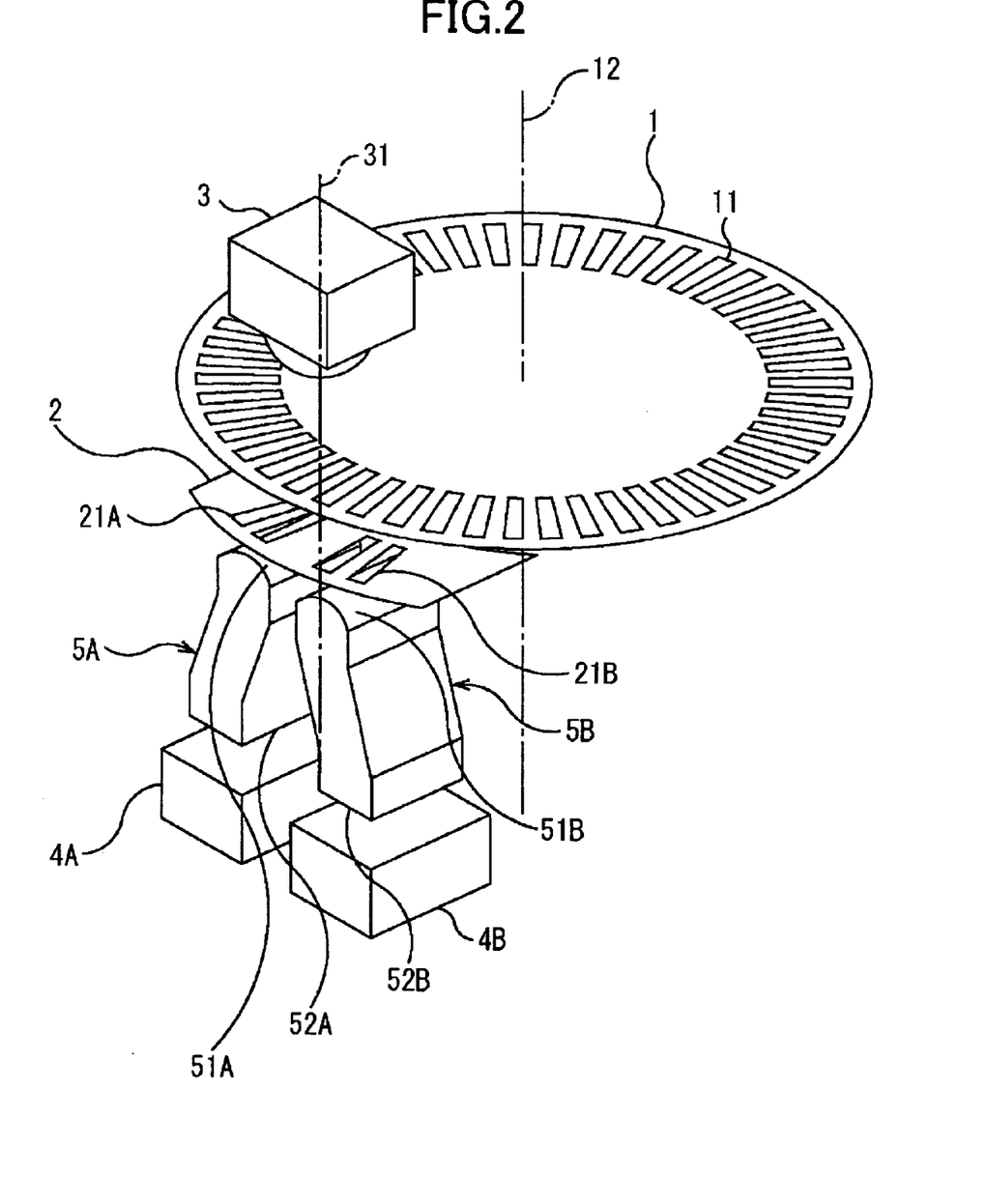
FIG. 2 is a schematic perspective view showing a second embodiment of the optical encoder according to the present invention.

FIG. 2 is a schematic perspective view showing a second embodiment of the optical encoder according to the present invention. As shown in FIG. 2, the optical encoder comprises the rotary disk plate 1 and the stationary mask plate 2 disposed parallel to each other, and the light emitting element 3 and the light receiving elements 4A and 4B disposed opposite to each other in a manner of sandwiching these plates. On the rotary disk plate 1, there are formed rotary slits 11 at the specified angular interval Ap along the circumferential direction. The number of rotary slits 11 is represented by resolution P. According to this configuration, the rotary disk plate 1 revolves around the rotary shaft 12 to intermittently pass the light from the light emitting element 3 through the rotary slits 11.

The stationary mask plate 2 has apertures to split the light intermittently passing through the rotary disk plate 1 into at least two light fluxes having intermittent phases shifted from each other. According to the embodiment, the apertures of the stationary mask plate 2 comprise the stationary slit 21A and the stationary slit 21B to split the light into two light fluxes having phases shifted from each other. In this embodiment, the stationary slits 21A and 21B each comprise two slits. The angular interval between two slits is the same as that between rotary slits 11. There is a difference of n×Ap+Af between the group of stationary slits 21A and the group of stationary slits 21B. Corresponding to these groups, there are two light receiving elements 4A and 4B. The light receiving elements receive the above-mentioned two light fluxes respectively and output 2-phase electric signals that have a cycle corresponding to the intermittence and have phases shifted from each other.

As a general feature of the present invention, a light guiding member is provided between the stationary mask plate 2 and a set of light receiving elements 4A and 4B. According to the embodiment, the light guiding member comprises two light guides 5A and 5B. The pair of light guides 5A and 5B extend the close distance between two light fluxes and guide the two light fluxes from the stationary mask plate 2 to the two corresponding light receiving elements 4A and 4B. This configuration allows the two light receiving elements 4A and 4B to be disposed with an extended distance longer than the separating spacing (n×Ap+Af) between the two light fluxes. According to the embodiment, the light guide 5A comprises a transparent molding including the incident face 51A and the exit face 52A. The incident face 51A receives the light flux passing through the corresponding stationary slit 21A. The exit face 52A sends the received light flux out to the corresponding light receiving element 4A. The light guide 5A provides total reflection on all side surfaces except the incident face 51A and the exit face 52A. Likewise, the light guide 5B also comprises the similar molding enclosed in the reflective surface except the incident face 51B and the exit face 52B.

As a specific feature of the present invention, the incident face 51A of the light guide 5A is shaped into a cylindrical lens. The incident face 51A parallelizes a diffused light flux radiated from the light emitting element 3 and admits it into the light guide 5A. Almost the entire amount of the light flux is totally reflected on all the reflective surfaces of the light guide 5A and is efficiently guided to the exit face 52A. Likewise, the incident face 51B of the light guide 5B is also shaped into a convex, cylindrical lens. The incident face 51B parallelizes a diffused light flux radiated from the light emitting element 3 and admits it into the light guide 5B.

As mentioned above, the stationary mask plate 2 is assembled parallel to the rotary disk plate 1. The stationary mask plate 2 contains two groups of stationary slits 21A and 21B. As mentioned above, there is an angle spacing of n×Ap+Af between the stationary slits 21A and 21B. The light emitting element 3 and the light receiving elements 4A and 4B are assembled in a manner of sandwiching the rotary disk plate 1 and the stationary mask plate 2. That is to say, the optical axis 31 connects the light emitting element 3 with the light receiving elements 4A and 4B, and parallels the rotary shaft 12. Here, the distance of disposing the pair of light receiving elements 4A and 4B is enlarged to be larger than the distance of disposing the stationary slits 21A and 21B. The light guides 5A and 5B are provided between the pair of light receiving elements 4A and 4B and the stationary mask plate 2. The light fluxes passing through the stationary slits 21A and 21B enter the corresponding light receiving elements 4A and 4B without loss of the light intensity. The light guides 5A and 5B are chiefly made of transparent PC or PMMA molding. The light entering from the convex incident face is guided to the exit face by repeating the total reflection inside the resin. The light fluxes are radiated to the corresponding light receiving elements 4A and 4B. While there may be a plurality of light emitting elements 3, one light emitting element 3 can decrease costs because the stationary mask plate 2 is positioned closely. The embodiment shown in FIG. 2 generates a 2-phase electric signal using two light receiving elements. Further, the same principle can be used to suppress variations among three or more phases. For example, a 4-phase electric signal requires four stationary slits. In this case, it is desirable to dispose four stationary slits two rows and two columns allocation to narrow the disposition spacing. According to the embodiment as shown in FIG. 2, the stationary mask plate 2 is positioned nearer to the light guides 5A and 5B. Instead, the stationary mask plate 2 may be placed nearer to the light emitting element 3. Alternatively, two stationary mask plates 2 may be provided at both sides of the light receiving element and the light emitting element so as to sandwich the rotary disk plate vertically.

Figure 3:
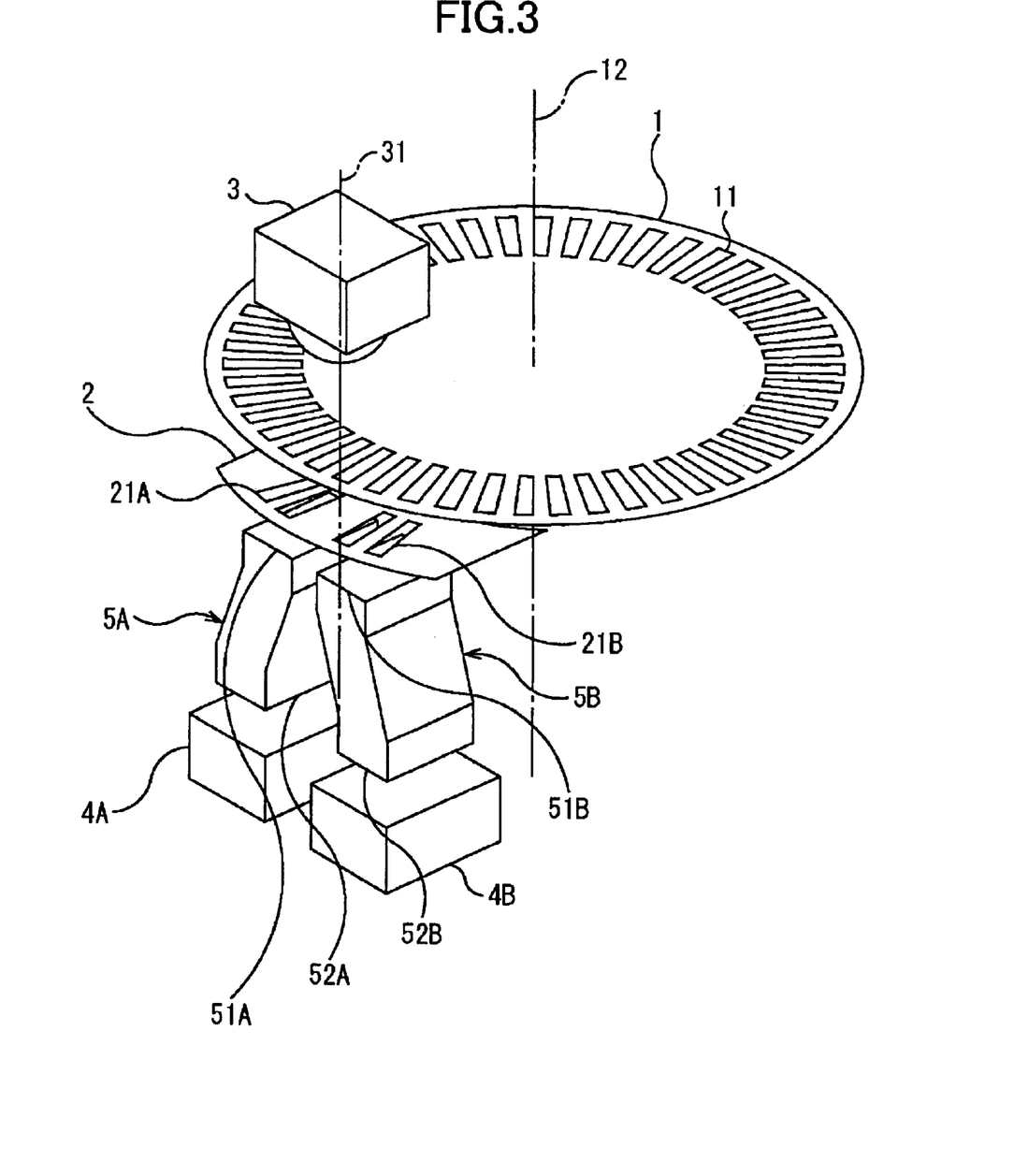
FIG. 3 is a schematic perspective view showing a reference example of an optical encoder disclosed in an earlier application.

FIG. 3 is a schematic perspective view showing an example of the optical encoder described in earlier application 1. For ease of understanding, the corresponding components in FIG. 3 are designated by the same reference numerals as those in FIG. 2 that shows the second embodiment of the optical encoder according to the present invention. There is the following difference. The light guide according to the second embodiment has the convex incident face. On the other hand, the light guides 5A and 5B in this reference example have the flat incident faces 51A and 51B. Accordingly, the light guides 5A and 5B unchangedly admits the diffused light flux radiated from the light emitting element 3 without parallelizing the light flux.

Figure 4:
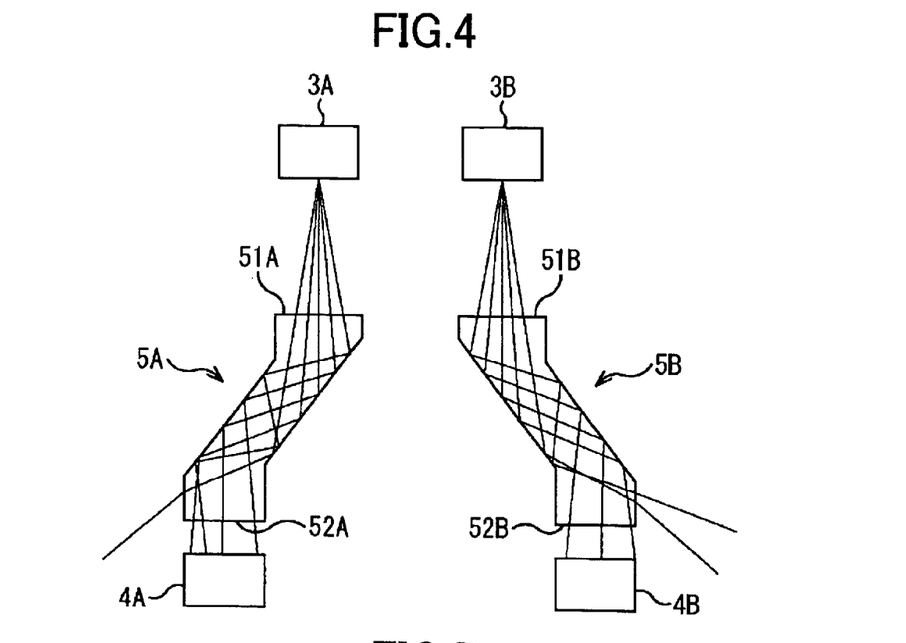
FIG. 4 is a schematic geometric optical diagram showing a reference example of the optical encoder.

FIG. 4 is a schematic geometric optical diagram of the optical encoder according to the reference example shown in FIG. 3. The rotary disk plate and the stationary mask plate are omitted for ease of explanation and simplification of illustration. Virtual light emitting elements 3A and 3B are used to represent two diffused light fluxes directed to the light guides 5A and 5B. Rays from the light emitting elements 3A and 3B are directly applied to the light guides 5A and 5B and are traced to the light receiving elements 4A and 4B. The light guides 5A and 5B according to the reference example have the flat surfaces 51A and 51B. The light flux is refracted at the incidence to narrow the diffusion angle in some degree. Nonetheless, repeating the reflection inside the light guides 5A and 5B increases incident angle components approximate to a right angle rather than the critical angle that determines the total reflection. Part of rays leaks out of the light guides 5A and 5B, degrading the light guiding efficiency.

Figure 5:
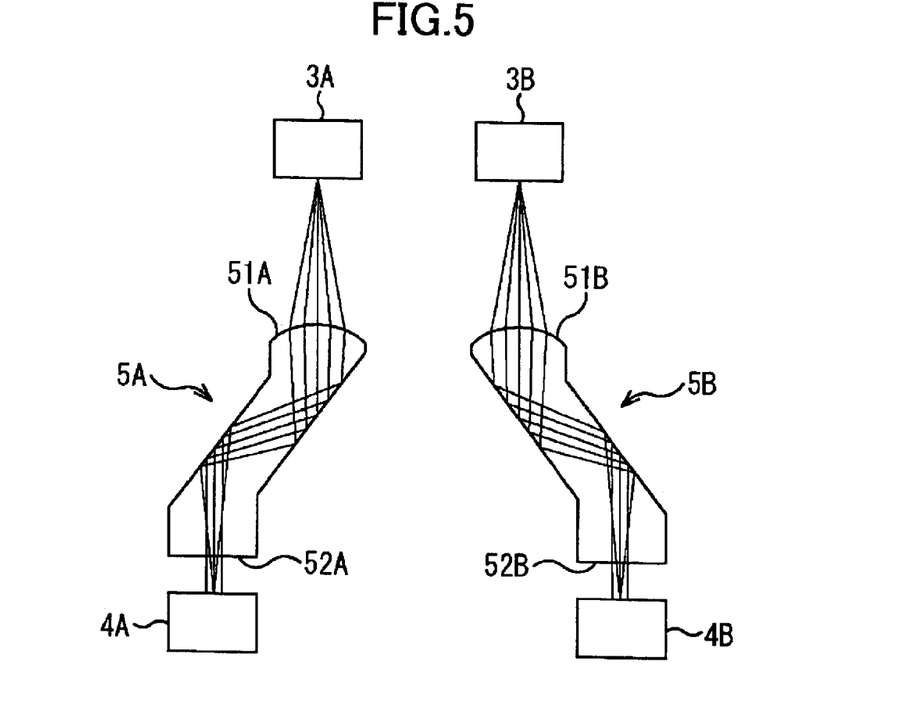
FIG. 5 is a schematic geometric optical diagram of the optical encoder according to the second embodiment.

FIG. 5 is a schematic geometric optical diagram of the optical encoder according to the second embodiment of the present invention as shown in FIG. 2. For ease of understanding, the corresponding components in FIG. 5 are designated by the same reference numerals as those in FIG. 4 that shows the geometric optical diagram of the optical encoder according to the reference example. As shown in FIG. 5, the light guides 5A and 5B have the incident faces 51A and 51B each shaped into a convex lens. The diffused light flux is refracted at the incidence to become almost parallel. The light fluxes repeat the total reflection inside the light guides 5A and 5B and efficiently radiate from the exit faces 52A and 52B to the corresponding light receiving elements 4A and 4B.

Figure 6:
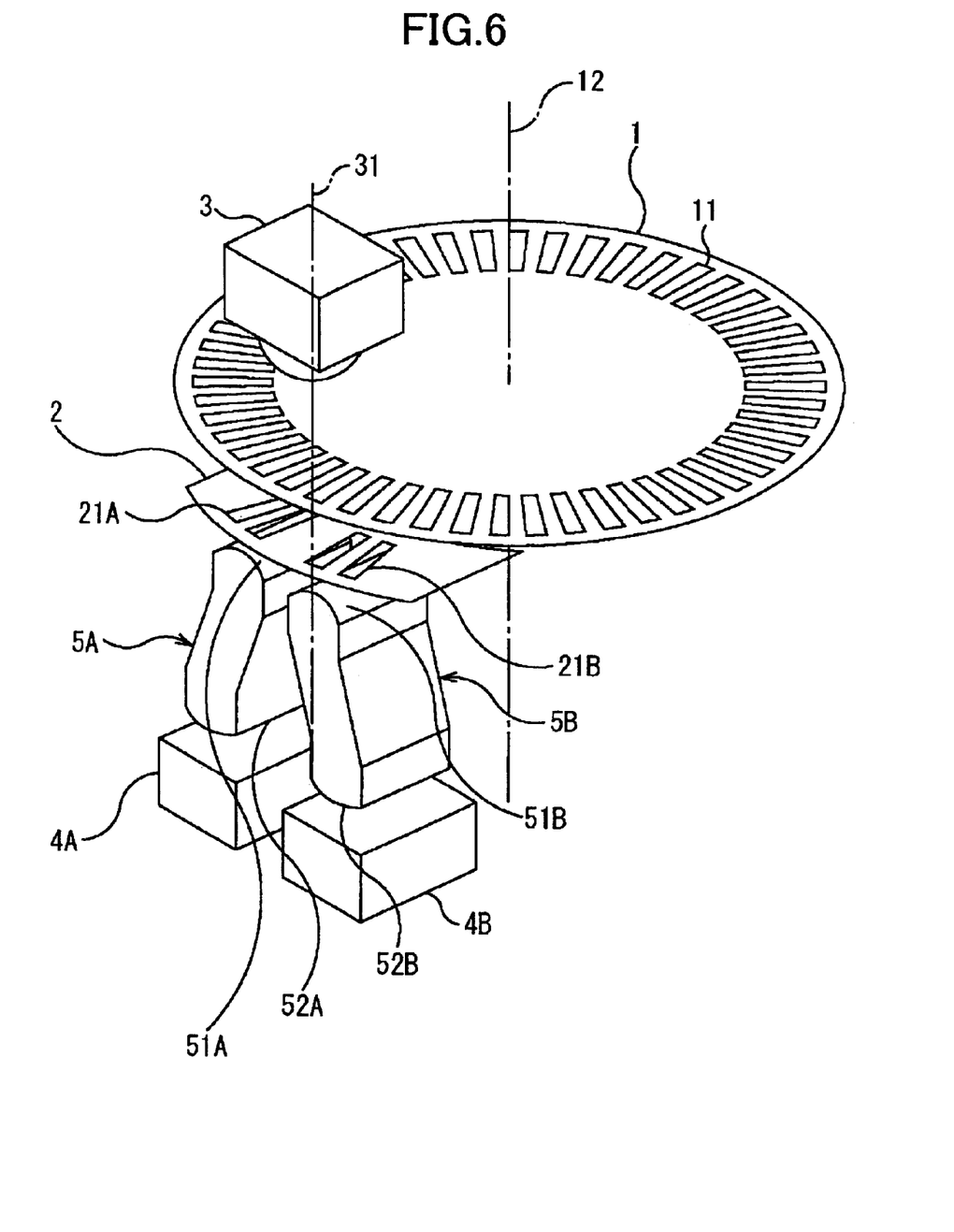
FIG. 6 is a schematic perspective view showing a third embodiment of the optical encoder according to the present invention.

FIG. 6 is a schematic perspective view showing a third embodiment of the optical encoder according to the present invention. For ease of understanding, the corresponding components in FIG. 6 are designated by the same reference numerals as those in FIG. 2 that shows the second embodiment. According to the second embodiment, each light guide has the flat exit face. According to the third embodiment, the light guides 5A and 5B have the convexly curved exit faces 52A and 52B. There may be a case where the light receiving elements 4A and 4B are much smaller than the exit faces 52A and 52B. In such case, it is preferable to shape the exit faces 52A and 52B into a convex lens like the incident faces 51A and 51B so that the radiated light flux can converge on the light receiving elements 4A and 4B. This is useful when the light fluxes radiated from the light guides 5A and 5B diffuse before reaching the light receiving elements 4A and 4B to decrease the amount of received light. The embodiment can further improve the efficient use of the light source by using the exit faces 52A and 52B shaped into convex lenses.

Figure 7:
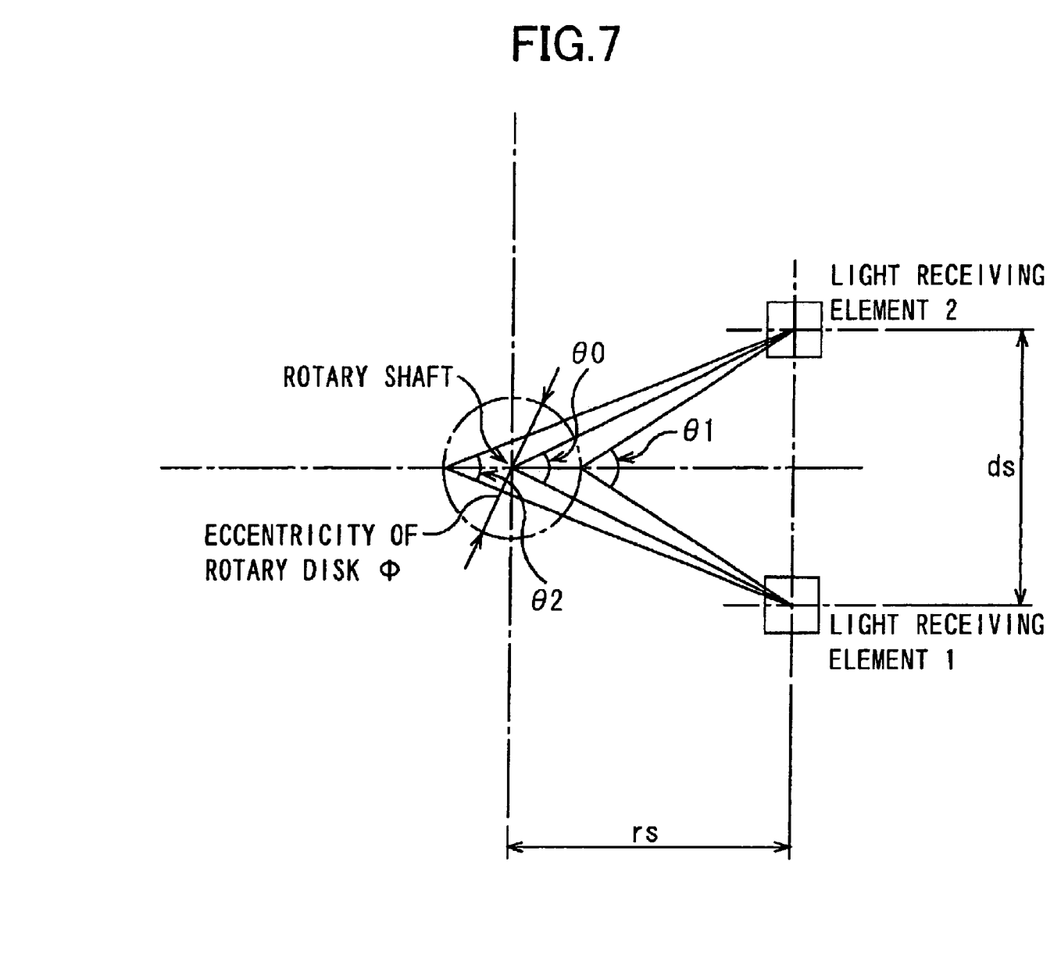
FIG. 7 is a schematic diagram showing the relationship between eccentricity of the rotary disk plate and a phase variation.

For easy understanding of the present invention, the following provides concise description about the relationship between eccentricity of the rotary disk plate and a phase variation of electric signals. FIG. 7 shows that a pair of light receiving elements 1 and 2 are separately disposed along the circumferential direction of the rotary disk plate. In FIG. 7, the reference symbol ds represents a distance between the light receiving element 1 and the light receiving element 2. The reference symbol rs represents a distance between the rotary shaft and each of the light receiving elements 1 and 2. When the rotary disk plate is eccentric as shown in FIG. 7, revolving the rotary disk plate allows its center to travel along a circular track. There is formed an angle at the center of the rotary disk plate by two lines leading to the light receiving elements 1 and 2 therefrom. This angle becomes maximum $\theta 1$ when the rotary disk plate center comes nearest to the middle between the light receiving elements 1 and 2. The angle becomes minimum $\theta 2$ when the rotary disk plate center goes farthest from the middle therebetween. Since the angle per interval is $2\pi/P$, it is possible to express a phase variation of the electric signal output from each light receiving element as $(\theta 1-\theta 2)/(2\pi/P) \times 100(\%)$. Consequently, decreasing $(\theta 1-\theta 2)$ decreases a phase variation. In order to decrease $(\theta 1-\theta 2)$, it is necessary to decrease eccentricity $\phi$ of the rotary disk plate, increase rs, and decrease ds. The present invention uses the light guide to decrease ds between a pair of light receiving elements 1 and 2.

Figure 8:
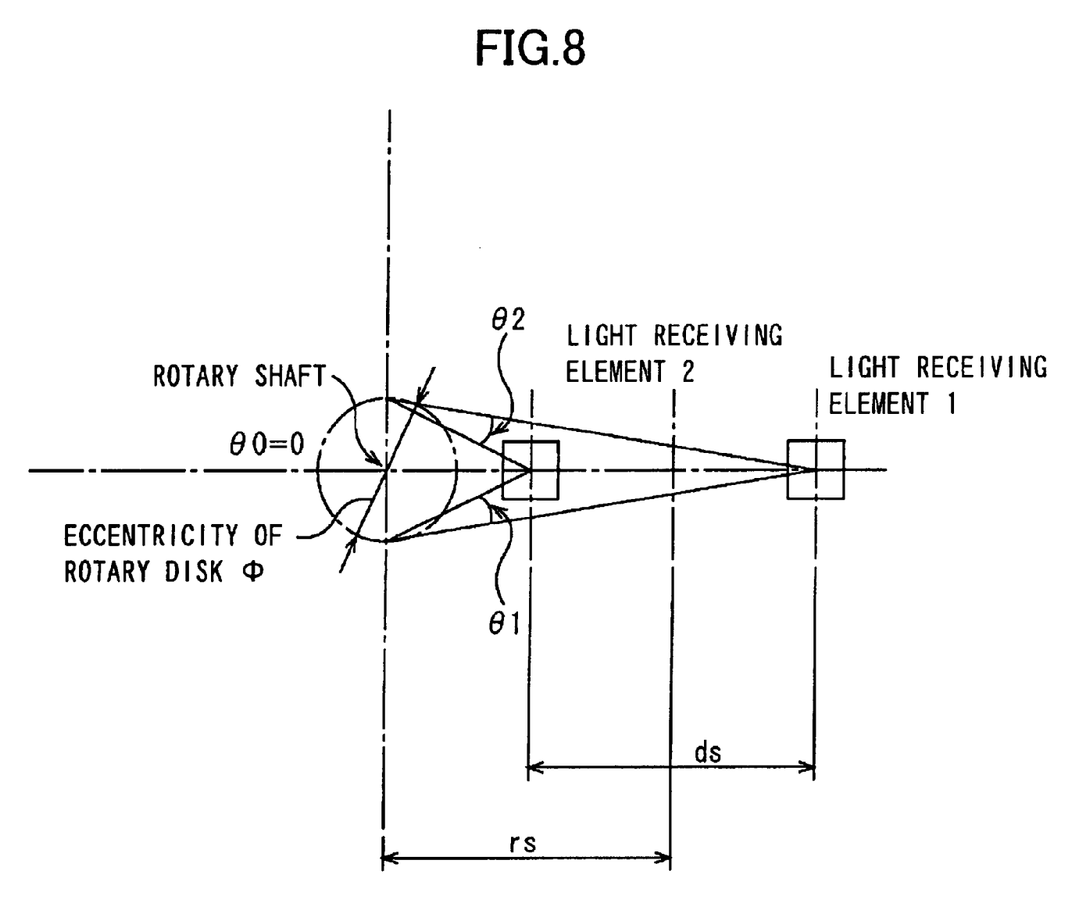
FIG. 8 is a schematic diagram showing the relationship between eccentricity of the rotary disk plate and a phase variation.

FIG. 8 shows that a pair of light receiving elements 1 and 2 are disposed along the radial direction. For ease of understanding, the corresponding components in FIG. 8 are designated by the same reference numerals as those in FIG. 7. There is formed an angle at the center of the rotary disk plate by two lines leading to the light receiving elements 1 and 2 therefrom. This angle becomes maximum when the rotary disk plate center comes around a point farthest from the light receiving elements 1 and 2. As obviously seen from FIG. 8, decreasing $(\theta 1-\theta 2)$ also decreases a phase variation. In order to decrease $(\theta 1-\theta 2)$, it is necessary to decrease eccentricity $\phi$ of the rotary disk plate, increase rs, and decrease ds. The problem to be solved by the present invention is how to decrease ds.

Figure 9:
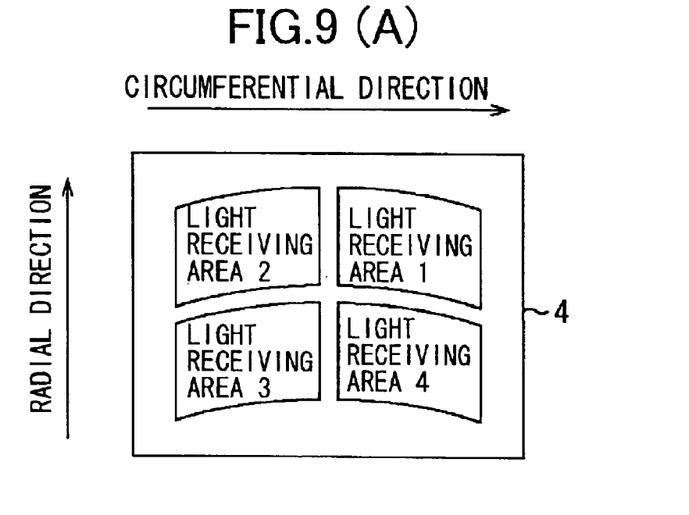
FIGS. 9(A) and 9(B) are schematic plan views showing layouts of light receiving elements according to the reference example and the embodiment.

As a means for solving this problem, there is available a technique to use a light receiving element (e.g., a photodiode array) having divided light receiving areas. FIG. 9 shows this technique as a reference. As shown in FIG. 9(A), the photodiode array constitutes the light receiving element 4 and comprises light receiving areas 1 through 4 integrated on a single chip. As a bare chip, the photodiode array is mounted on a printed circuit board of the optical encoder for use. FIG. 9(A) shows an example of the photodiode array comprising light receiving areas 1 and 2 disposed on an outer track along the radial direction and light receiving areas 3 and 4 disposed on an inner track along the radial direction. The light receiving areas 1 and 2 are separated along the circumferential direction and are phase shifted 180 degrees, for example. The light receiving areas 3 and 4 are also separated along the circumferential direction and are phase shifted 180 degrees from each other. The light receiving areas 1 and 4 are separated along the radial direction and are phase shifted 90 degrees from each other, for example. Likewise, the light receiving areas 2 and 3 are also phase shifted 90 degrees. In this manner, four light receiving areas are compactly mounted on the photodiode array. However, such photodiode array is costly. It cannot be easily used for low-cost encoders. Depending on cases, the photodiode array may be replaced by diode chips that are lead wired and are resin molded to be packaged and mounted on a printed circuit board for use. However, this package component is more costly than a single chip component.

FIG. 9(B) schematically shows a configuration enabling expanded disposition of the light receiving areas 1 through 4 through the use of light guides according to the present invention. As obviously seen from comparison between the reference example in FIG. 9(A) and the embodiment in FIG. 9(B), the use of light guides can expand a disposition spacing between adjacent light receiving areas along the radial direction and the circumferential direction. As a result, it is possible to dispose stand-alone photo chips 41 through 44, e.g., two rows and two columns allocation as shown in FIG. 9(B) instead of using the costly photodiode array. Low-cost, general-purpose photo transistors can be used for the single-chip light receiving elements 41 through 44. Obviously, the use of the light guides makes it possible to dispose the light receiving elements not only two rows and two columns allocation, but also in various manners.

As mentioned above, according to the general feature of the present invention, the use of the light guides makes it possible to dispose the light receiving elements with a spacing even if a plurality of stationary slits is disposed adjacently to each other. Low-cost, general-purpose photo transistor chips can be used. It is possible to provide the low-cost, high-resolution optical encoder that suppresses degradation of the phase accuracy due to eccentricity of the rotary slits. According to the specific feature of the present invention, at least the incident face of the light guide is shaped to be a convex lens. It is possible to improve the light guiding efficiency from the light emitting element to the light receiving element.

What is claimed is:

1. An optical encoder comprising a rotary disk plate and a stationary mask plate disposed parallel to each other, and a light emitting element and a light receiving element disposed opposite to each other with respect to a set of the rotary disk plate and the stationary mask plate, wherein the rotary disk plate has slits formed along a circumferential direction thereof at a given interval, and rotates to intermittently pass light from the light emitting element through the slits such that the passed light has a periodical intensity variation;

wherein the stationary mask plate has apertures spatially shifted from each other, and splits the passed light by the apertures into at least two light fluxes with a given spacing, the two light fluxes having different phases of the periodical intensity variation due to the spatial shift of the apertures;

wherein there are provided at least two light receiving elements which receive the two light fluxes respectively, and generate at least two electric signals having a cycle corresponding to the periodical intensity variation of the light fluxes and having different electric phases corresponding to the different phases of the periodical intensity variations;

wherein the optical encoder further comprises a light guiding member provided between the stationary mask plate and the light receiving elements to guide the light fluxes from the stationary mask plate to the respective light receiving elements while expanding the spacing between the light fluxes such that the light receiving elements are spaced from each other at a distance greater than the spacing of the light fluxes;

wherein the light guiding member has an incident face to admit the light flux and an exit face to send the light flux to the light receiving element; and wherein at least the incident face is convexly curved to converge the light flux, thereby efficiently transmitting the light flux to the exit face.

2. The optical encoder according to claim 1,
wherein the exit face is also convexly curved to condense the light flux, thereby efficiently sending the light flux to the light receiving element.

3. The optical encoder according to claim 1,
wherein the stationary mask plate has the apertures which are arranged along the circumferential direction of the rotary disk plate, and which are divided into two groups spaced from each other in a radial direction of the rotary disk plate; and
wherein the two groups of the apertures split the light intermittently passed through the rotary disk plate into the two light fluxes with leaving the spacing therebetween.

4. The optical encoder according to claim 1,
wherein the stationary mask plate has the apertures which are arranged along the circumferential direction of the rotary disk plate, and which are divided into two groups spaced from each other in the circumferential direction; and
wherein the two groups of the apertures split the light intermittently passed through the rotary disk plate into the two light fluxes with leaving the spacing therebetween.

5. The optical encoder according to claim 1,
wherein the two light receiving elements are both accommodated inside an outer periphery of the rotary disk plate for miniaturization.

* * * * *